Sept. 2, 1952          J. D. WATSON ET AL          2,609,420
DEVICE FOR MEASURING THE THICKNESS OF STEEL PLATES AND THE LIKE Filed July 13, 1950                                       2 SHEETS—SHEET 1

INVENTORS,
James Derrick Watson and
Samuel Skipton Carlisle,
By Pierce, Scheffler & Parker,
ATTORNEYS.

UNITED STATES PATENT OFFICE 2,609,420

DEVICE FOR MEASURING THE THICKNESS OF STEEL PLATES AND THE LIKE

James D. Watson and Samuel Skipton Carlisle, London, England, assignors to The British Iron & Steel Research Association, London, England, a British company Application July 13, 1950, Serial No. 173,544
In Great Britain July 15, 1949

8 Claims. (Cl. 175—183)

The present invention relates to devices of the kind adapted for the non-destructive measurement of the thickness of plates, sheets, tube walls or the like of ferrous material.

One object of the present invention is to provide a device for measuring the thickness of steel plates or pipe walls where only one face is accessible.

To this end the invention provides a device of the kind specified comprising means for producing a magnetic saturation flux density in a portion of a body whose thickness is to be measured, a moving coil element adapted to be energised with a predetermined current, and means for producing a magnetic field in the vicinity of said moving coil element and which is proportional to said saturation flux density whereby the deflection of said moving coil element is proportional to said thickness.

In one preferred arrangement the device comprises an electromagnet having pole faces adapted to be held adjacent a sheet member whose thickness is to be determined for producing a magnetic saturation flux in a portion of said member, a magnetic circuit in shunt with the magnetic circuit of said electromagnet and providing a magnetic field in which a moving coil element is mounted, said field being proportional to the flux in the electromagnet circuit, and means for producing an opposing magnetic field operating on said moving coil element and which is adapted substantially to cancel that proportion of flux in the shunt magnetic circuit which is due to the air flux in the magnetic circuit of said electromagnet, the arrangement being such that by energising said moving coil element with a current whose value is dependent upon the material of which said member is composed, the deflection of said moving coil element is proportional to the thickness of said member.

It will be understood that the principle of measurement employed is to apply to the portion of the specimen to be tested a magneto-motive force sufficient to produce saturation flux in the specimen and to measure the flux set up in the main magnetic circuit. The determination of thickness thus depends on the saturation flux density parameter of the material of the specimen but it is a simple matter to adjust the calibration of the instrument when used on materials of appreciably differing maximum B value. It has been found that saturation flux density varies but little over the range of carbon steels normally encountered and that for these steels the parameter is little effected by the heat treatment to which the steel has been subjected.

One construction of device, according to the present invention and in the form of a portable thickness measuring instrument, will now be described, by way of example only, with reference to the accompanying drawings in which.

Figure 1:
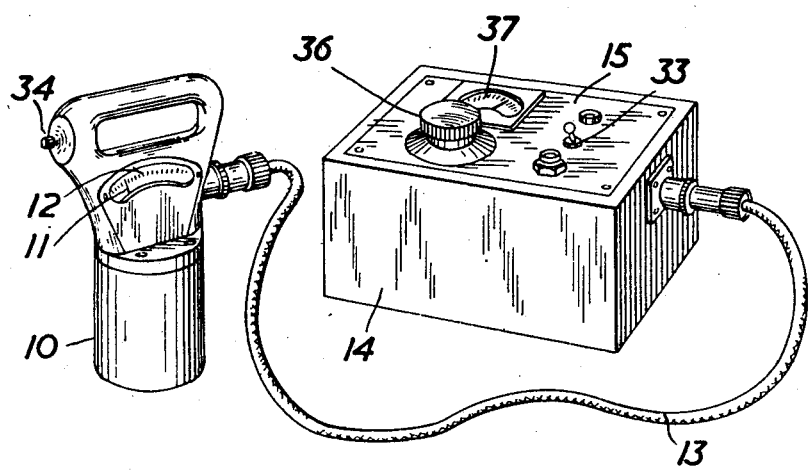
Figure 1 is a perspective view of the complete instrument, whilst

Referring now to the drawings, and to Figure 1 in particular, it will be seen that the instrument comprises a gauge portion 10 which is applied to the member whose thickness is to be measured, the thickness being indicated by the pointer 11 on the calibrated scale 12. The gauge portion 10 is connected by a flexible electrical cable 13 to a box 14 which houses the battery power supply and the control member mounted on the panel 15.

Figure 2:
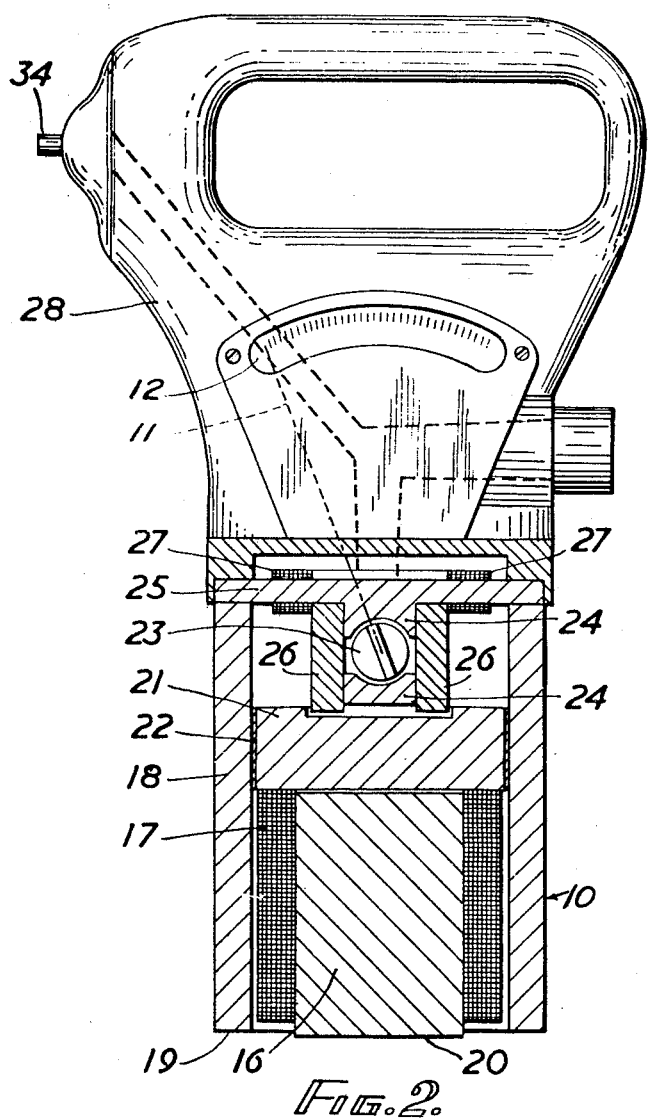
Figure 2 is a part sectional front elevation of the gauge portion of the instrument.

The saturation flux produced in the member whose thickness is being measured is developed in the gauge portion 10 by an electromagnet. As shown in Figure 2 this electromagnet comprises a central pole piece 16, which in this particular construction measures 1.3 inches in diameter and 1⅞ inches in height and is surrounded by the magnetising winding 17. The central pole piece 16 is disposed coaxially within an open ended cylinder 18 measuring 2 inches in internal diameter and 3½ inches in height, the lower end of the cylinder 18 forming an outer pole face 19 coplanar with the pole face 20 on pole piece 16, so that the pole faces 19 and 20 can be pressed against the surface of the specimen to be tested. Alternatively the pole piece 16 can project beyond the end of the cylinder 18 to permit use on uneven surfaces. The main magnetic circuit for producing the saturation flux is completed by a disc 21, which may for example be ⅝ inch thick and which fits within the cylinder 18 and has its lower face in contact with the upper end of the central pole piece 16. An annular non-magnetic gap of about some 0.015 inch in width is introduced into the main magnetic circuit by the presence of a thin brass cylinder 22 between the periphery of the disc 21 and the cylinder 18 the whole being a tight push fit. The magnetomotive force developed across this non-magnetic gap provides an energising field for a small moving coil element 23 similar to those normally used in moving coil measuring instruments which is mounted in a shunt magnetic circuit between shaped pole pieces 24 secured to the lower face of a bar 25 of magnetic material extending across the open upper end of the outer cylinder 18, the lower one of the pole pieces 24 being supported by non-magnetic members 26 with its lower end separated from the upper face of the disc 21 by an air gap of 1/16 of an inch.

The total flux in the main magnetic circuit when a measurement is being made comprises the flux actually passing through the specimen under test and the air flux, i. e. the flux which would be set up by the same value of magnetising current through the winding 17 in the absence of a specimen. The former component is substantially independent of the magneto-motive force applied, providing it is sufficient to saturate the cylindrical portion of the test specimen lying directly under the pole face 20 but the air flux component increases with the magneto-motive force applied. In order to cancel out the effect of the air flux component in the shunt magnetic circuit an opposing magneto-motive force is introduced into this shunt circuit. This magneto-motive force is provided by coils 27 fitted on the bar 25 carrying the pole pieces 24, the coils 27 being connected in series with the main magnetising winding 17 and having their number of turns adjusted to compensate as nearly as possible for the air flux. The deflection of the moving coil element 23 is thus made substantially independent of the magnetising current over a wide range. With one instrument which has been constructed a reduction of 20% in the magnetising current introduced an error of about 3% in the instrument reading when used on plates of 100–200 thousandths of an inch thickness. All members forming parts of the main or shunt magnetic circuits are made from annealed soft iron. A casing member 28 mounted on the upper end of the cylinder 18 carries the scale 12 co-operating with pointer 11 secured to the moving coil element 23, the casing member 28 being shaped to provide a hand grip.

Figure 3:
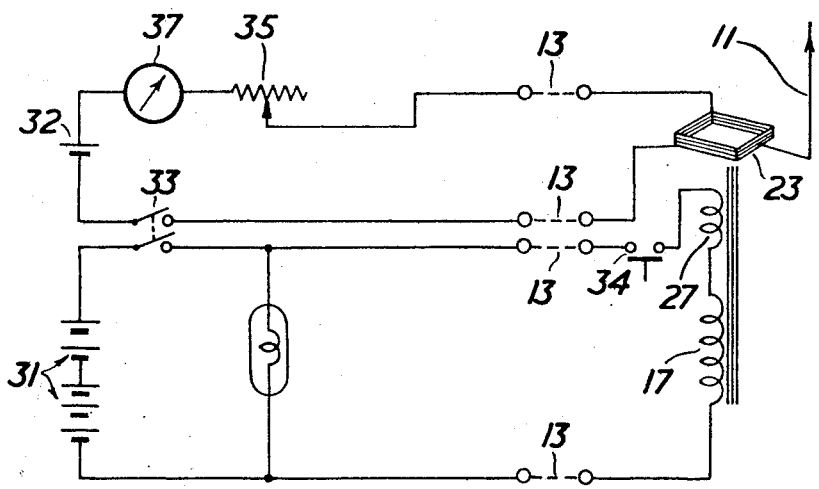
Figure 3 is a circuit diagram of the instrument.

Referring now to Figures 1 and 3, the control box 14 is arranged to accommodate 5 nickel cadmium alkaline accumulators of 25 amp-hour capacity (shown diagrammatically as 31 in Figure 3) for supplying the magnetising coil 17 and air flux compensating coils 27 and a 1½ volt pocket cell (shown diagrammatically as 32 in Fig. 3) for energising the moving coil element 23 the current being conveyed through the cable 13. A main on/off switch 33 is fitted on the panel 15 and a push button switch 34 for completing the magnetising circuit is fitted on the casing member 28. The moving coil circuit includes a variable resistance 35 housed in the box 14 which can be adjusted by the knob 36 to vary the value of the current through the moving coil element 23 in accordance with the particular value of the saturation flux density parameter of the material under test, thereby allowing the scale 12 to be calibrated to give a direct reading of thickness. The value of the moving coil current is indicated on a milliammeter 37 mounted on the panel 15.

In making a thickness measurement the moving coil excitation current is first set to the value specified for the particular material being tested, the values for different materials having been previously determined from the saturation flux density parameters and preferably tabulated. The pole faces 19 and 20 are then applied to the surface and the push button 34 operated to excite the electro-magnet. The reading on the scale 12 gives the thickness in thousandths of an inch. The central pole face 20 at least should be as nearly as possible in contact over its whole area with the surface of the test piece, but with the construction described above, an air gap of about 6 mils (which may be caused for example by surface roughness or by the presence of a non magnetic coating) can be tolerated before an effect on the reading is detectable. A test with an experimental instrument showed that the maximum error to be expected in the instrument reading is about ±5 mils for a 200 mil plate falling to ±3 mils for a 100 mil plate and below, but it is hoped to improve on these results.

The above construction was designed particularly for determining the thickness of residual metal in heavily corroded steel plates where one face is in the normal finished state having been protected by a paint coating, while the other is deeply pitted and usually covered with a scale of atmospheric corrosion products, only one face being available for test. It may also be used for checking the uniformity of thickness of wide steel sheets. For this purpose the value of B max. for the specimen need not be known. A further use is for checking the value of B max. for electric sheet steels in specimens of known thickness.

It will be appreciated that the particular construction described provides an instrument which is readily portable as it may be entirely operated from batteries, and is also sufficiently robust for field use.

We claim:

1. A device of the kind specified comprising means for producing a magnetic saturation flux density in a portion of a body whose thickness is to be measured, said means comprising an electromagnet having a ferromagnetic body with pole faces which can be brought adjacent a surface of the body whose thickness is to be measured, said ferromagnetic body having a narrow non-magnetic gap in it, core means forming a shunt magnetic circuit in series with said non-magnetic gap and a part of said ferromagnetic body, said shunt magnetic circuit having an air gap therein in which a magnetic field is produced by the magneto-motive force developed across said non-magnetic gap, which magnetic field is proportional to said saturation flux density, and a moving coil element adapted to be energized with a predetermined current, said moving coil element being mounted in the air gap in said shunt magnetic circuit.

2. A device according to claim 1, comprising means for producing in the air gap of said shunt magnetic circuit a further magnetic field which is adapted to oppose and substantially to cancel that proportion of flux in the shunt magnetic circuit which is due to the air flux in the electromagnet.

3. A device according to claim 1, in which a coil is wound on the core means of the shunt magnetic circuit, said coil being in series with the electromagnet winding and being constructed to produce an opposing flux acting on the moving coil element substantially to balance out that proportion of flux in the shunt circuit which is due to the air flux of the electromagnet.

4. A device of the kind specified comprising an electromagnet having pole faces adapted to be held adjacent a sheet member whose thickness is to be determined for producing a magnetic saturation flux in a portion of said member, a magnetic circuit in shunt with the magnetic circuit of said electromagnet and providing a magnetic field in which a moving coil element is mounted, said field being proportional to the flux in the electromagnet circuit, and means for producing an opposing magnetic field operating on said moving coil element and which is adapted substantially to cancel that proportion of flux in the shunt magnetic circuit which is due to the air flux in the magnetic circuit of said electromagnet, the arrangement being such that by energising said moving coil element with a current whose value is dependent upon the material of which said member is composed the deflection of said moving coil element is proportional to the thickness of said member.

5. A device according to claim 4, in which the means for producing an opposing magnetic field comprises a coil inductively linked with the shunt magnetic circuit, said coil being in series with the electromagnet winding.

6. A device according to claim 4, in which said magnet comprises a central core surrounded by an energising winding, one end of said core providing one pole face of the electromagnet, and a hollow cylindrical member of magnetic material surrounding said core and winding, the end of said cylindrical member adjacent said one pole face constituting the other pole face of said electromagnet.

7. A device according to claim 6, in which said cylindrical member is considerably longer than said core, the pole faces lying in substantially the same plane, and a disc of magnetic material substantially completes the magnetic circuit between said core and cylindrical member, a portion of said cylindrical member remote from the pole faces extending beyond said disc and forming part of the shunt magnetic circuit.

8. A device of the kind specified comprising a main magnetic circuit including an electromagnet having an energising winding by which a magnetic saturation flux may be produced in a portion of a member whose thickness is to be measured, a further magnetic circuit arranged in shunt with a portion of the main magnetic circuit so that there is a narrow non-magnetic gap between the further magnetic circuit and said portion of the main magnetic circuit, said further magnetic circuit having confronting pole pieces forming an air gap in which a magnetic field is produced by the magnetomotive force developed across said non-magnetic gap by the means producing the magnetic saturation flux, whereby said magnetic field is proportional to said saturation flux, a moving coil element mounted in the air gap in said further magnetic circuit, whereby when said moving coil element is energized with a predetermined current whose value is dependent upon the saturation flux density parameter of the material of which said member is composed the deflection of said moving coil element is substantially proportional to the thickness of the portion of the member under test, and a coil wound on a core means of the further magnetic circuit, said coil being in series with the electromagnet winding and being constructed to produce an opposing flux acting on the moving coil element substantially to balance out that proportion of flux in the further magnetic circuit which is due to the air flux of the electromagnet.

JAMES D. WATSON.
SAMUEL SKIPTON CARLISLE.

REFERENCES CITED

The following references are of record in the file of this patent:

UNITED STATES PATENTS

| Number | Name | Date |
|---|---|---|
| 1,428,833 | Bindschedler | Sept. 12, 1922 |
| 1,682,435 | Spooner | Aug. 28, 1928 |
| 1,966,984 | Lichtenberger et al. | July 17, 1934 |
| 2,029,023 | Hoover | Jan. 28, 1936 |
| 2,489,066 | Wiig | Nov. 22, 1949 |

FOREIGN PATENTS

| Number | Country | Date |
|---|---|---|
| 601,490 | England | May 6, 1948 |